(12) United States Patent
Yokoyama

(10) Patent No.: US 6,437,069 B1
(45) Date of Patent: Aug. 20, 2002

(54) CURABLE RESIN COMPOSITION

(75) Inventor: Katsutoshi Yokoyama, Osaka (JP)

(73) Assignee: Daiso Co., Ltd., Osaka (JP)

( * ) Notice: Subject to any disclaimer, the term of this patent is extended or adjusted under 35 U.S.C. 154(b) by 134 days.

(21) Appl. No.: 09/630,561

(22) Filed: Aug. 2, 2000

(30) Foreign Application Priority Data

Aug. 2, 1999 (JP) ............................................. 11-218729

(51) Int. Cl.$^7$ .............................................. C08F 293/00
(52) U.S. Cl. ........................ 526/321; 526/314; 526/322
(58) Field of Search ................................. 526/314, 321, 526/322

(56) References Cited

FOREIGN PATENT DOCUMENTS

| JP | 53-7787 | 1/1978 |
|----|---------|--------|
| JP | 1-246501 | 10/1989 |

*Primary Examiner*—Helen L. Pezzuto
(74) *Attorney, Agent, or Firm*—Wenderoth, Lind & Ponack, L.L.P.

(57) ABSTRACT

A curable resin composition comprising (A) at least one aromatic diallyl compound, (B) at least one maleate diester and/or fumarate diester, (C) at least one (meth)allyl carbonate compound and (D) at least one radical chain transfer agent gives a cured material having excellent optical and mechanical properties.

14 Claims, No Drawings

CURABLE RESIN COMPOSITION

FIELD OF THE INVENTION

The present invention relates to a curable resin composition for optical application which can provide an optical part such as a plastic lens (for example, for spectacles) and a camera lens, and optically related product such as an adhesive and a coating agent, having excellent optical properties such as refractive index, an Abbe number and transparency and various excellent mechanical properties.

RELATED ART

Because organic glass has lighter weight than inorganic glass, the organic glass is noteworthy as an lens material. Presently the organic glass made of a polymer derived from a monomer such as diethylene glycol bis(allyl carbonate) is used. The organic glass comprising diethylene glycol bis (allyl carbonate) has light weight and is excellent in impact resistance, dimensional stability, machinability, dyeability and hard coat property. The organic glass is frequently used as a spectacle lens instead of the inorganic glass.

The organic glass comprising diethylene glycol bis(allyl carbonate) has low refractive index of 1.50 so that the lens must have large thickness for practical uses whereby eliminating a merit of light weight and giving bad appearance. This trend is remarkable in particularly the lens having high power, and the organic glass comprising diethylene glycol bis(allyl carbonate) is not suitable for the spectacle lens material.

A plastic lens material having higher refractive index, which comprises a diallyl phthalate monomer or a derivative of bisphenol A, is proposed to eliminate such defects (for example, JP-A-53-7787). However, this lens material somewhat lacks in transparency, impact resistance, processability and the like. For example, because the diallyl phthalate monomer is useful as a non-volatile crosslinking agent having a high boiling point and has the high refractive index, it is an attractive optical material. The cured material of the diallyl phthalate monomer alone has the high refractive index and high cure degree. However, it is brittle and largely colored so that it cannot be used as the optical material, particularly the lens material.

In order to overcome the above defects, a high refractive index plastic lens comprising a copolymer of diallyl ester, diethylene glycol bis(allyl carbonate) and maleate diester has been recently proposed (JP-A-1-246501). This technology decreases the initial coloring after the polymerization and molding. However, the colorless transparency is important in view of the practicality of the lens, and cannot be achieved by this technology. This plastic lens has frequently cracks around the molded lens so that the brittleness of the resin can not be eliminated.

SUMMARY OF THE INVENTION

One of objects of the present invention is to provide a optical resin composition giving an optical material such as a plastic lens, having excellent optical properties, for example, a refractive index and an Abbe number, having excellent mechanical and thermal properties, for example, thermal resistance and impact resistance, and having colorless transparency and reduced brittleness of a cured material.

The present invention relates to a curable resin composition comprising:
(A) at least one aromatic diallyl compound,
(B) at least one maleate diester and/or fumarate diester represented by the general formula (1):

$$R^1\text{—OOCCH}=\text{CHCOO—}R^2 \quad (1)$$

wherein $R^1$ and $R^2$ is, same or different, an alkyl group, cycloalkyl group, aralkyl group, aryl group, alkenyl group or alkynyl group having 1 to 15 carbon atoms,
(C) at least one (meth)allyl carbonate compound represented by the general formula (2):

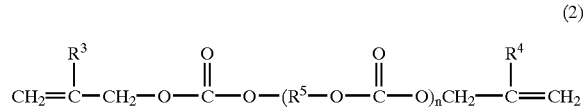

(2)

wherein $R^3$ and $R^4$ is, same or different, a hydrogen atom or a methyl group, $R^5$ is a divalent organic group optionally having an oxygen atom, and n is from 1 to 10, and
(D) at least one radical chain transfer agent.

DETAILED DESCRIPTION OF THE INVENTION

The aromatic diallyl compound (A) used in the present invention may be a polybasic acid ester of an ally alcohol which has an aromatic ring. Specific examples of the aromatic diallyl compound (A) include diallyl isophthalate, diallyl orthophthalate and diallyl terephthalate. These are used alone or in combination thereof Diallyl isophthalate is particularly preferable.

The amount of the aromatic diallyl compound (A) is preferably from 40 to 90% by weight, more preferably from 45 to 85% by weight, based on the total amount of the components (A)–(D).

In the general formula (1) representing the maleate diester/fumarate diester (B) used in the present invention, $R^1$ or $R^2$ is preferably a saturated hydrocarbon group (that is, a $C_{1-15}$ alkyl group and $C_{4-15}$ cycloalkyl group), a $C_{7-15}$ aralkyl group, a $C_{6-15}$ aryl group, a $C_{2-15}$ alkenyl group or a $C_{2-15}$ alkynyl group. The carbon number in $R^1$ and $R^2$ is preferably from 1 to 8, particularly from 4 to 6. $R^1$ and $R^2$ is preferably saturated.

Specific examples of the maleate diester include diphenyl maleate, benzyl phenyl maleate, dibenzyl maleate, dimethyl maleate, ethyl benzyl maleate, diethyl maleate, di-n-butyl maleate, di(2-ethylhexyl) maleate, dinonyl maleate, cyclohexyl phenyl maleate, allyl benzyl maleate, diallyl maleate and methallyl benzyl maleate.

Specific examples of the fumarate diester include diphenyl fumarate, benzyl phenyl fumarate, dibenzyl fumarate, dimethyl fumarate, ethyl benzyl fumarate, diethyl fumarate, di-n-butyl fumarate, di(2-ethylhexyl) fumarate, dinonyl fumarate, cyclohenyl phenyl fumarate, allyl benzyl fumarate, diallyl fumarate and methallyl benzyl fumarate.

Di-n-butyl maleate, dibenzyl maleate, diethyl maleate, di-n-butyl fumarate, dibenzyl fumarate and diethyl fumarate are preferable. The diester (B) may be the maleate diester, the fumarate diester or a combination of thereof, and is preferably the maleate diester.

The amount of the maleate diester/fumarate diester (B) is preferably from 1 to 30% by weight, more preferably from 3 to 20% by weight, based on the total amount of the components (A) to (D).

In the (meth)allyl carbonate compound (C), both of $R^3$ and $R^4$ are preferably a hydrogen atom.

$R^5$ is a divalent organic group optionally having an oxygen atom, and may be, for example, an organic group of the formula:

—A¹—, or

—A²—O—A³— wherein A¹, A² and A³ each is a linear or branched alkylene group having 1 to 6 carbon atoms.

Specific examples of A¹, A² and A³ include an ethylene group, a 1-methylethylene group, a trimethylene group, a tetramethylene group, a 1-methylpropylene group and a 2,2-dimethylpropylene group.

n is from 1 to 10, for example, from 1 to 5.

Specific examples of the (meth)allyl carbonate compound (C) include ethylene glycol bis(allyl carbonate), propylene glycol bis(allyl carbonate), 1,3-propanediol bis(allyl carbonate), 1,4-butanediol bis(allyl carbonate), 1,3-butanediol bis(allyl carbonate), neopentyl glycol bis(allyl carbonate), diethylene glycol bis(allyl carbonate) and dipropylene glycol bis(allyl carbonate). Diethylene glycol bis(allyl carbonate) is preferable.

Dimers and trimers may be used in addition to the (meth)allyl carbonate compound (C) in the form of monomer.

Diethylene glycol bisallyl carbonate, diethylene glycol bisallyl carbonate dimer and diethylene glycol bisallyl carbonate trimer are particularly preferable as the (meth)allyl carbonate compound (C).

The amount of the (meth)allyl carbonate compound (C) is preferably from 5 to 50% by weight, more preferably from 10 to 40% by weight, based on the total amount of components (A) to (D).

Specific examples of the radical chain transfer agent (D) used in the present invention include mercaptans, halogenated hydrocarbons and phenyl-containing monoolefins.

The mercaptans may be a compound having one mercapto group. Specific examples of the mercaptans include octyl mercaptan, lauryl mercaptan, t-dodecyl mercaptan, n-hexadecyl mercaptan, n-tetradecyl mercaptan, m-thiocresol, thiophenol, thioglycol (2-mercaptoethanol), 2-ethylhexyl thioglycolate and β-naphthalene thiol.

The halogenated hydrocarbons are hydrocarbons substituted with at least one halogen atom, for example, chlorine, bromine and iodine. Examples of the halogenated hydrocarbons include carbon tetrachloride and ethylene bromide.

The phenyl group-containing monoolefin is a monoolefin having at least one phenyl or phenylene group. The phenyl group-containing monoolefin may be of the formula (i), (ii), (iii) and (iv):

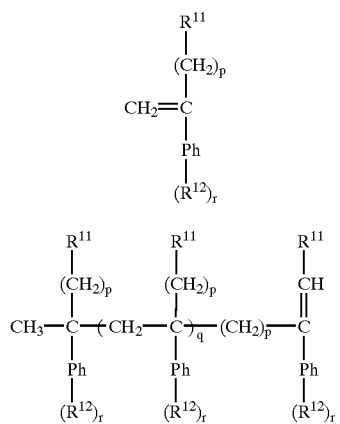

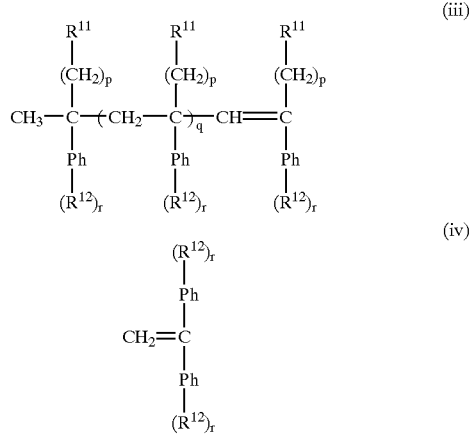

wherein $R^{11}$ is a hydrogen atom or an alkyl group, $R^{12}$ is a hydrogen atom, an alkyl group, an alkoxy group, an amino group, a nitro group, a carboxyl group, an ester group, Ph is a phenylene group, p is 0 or 1, q is an integer of 0 to 3, and r is from 0 to 5. The alkyl group and alkoxy group may have 1 to 15 carbon atoms.

Specific examples of the phenyl group-containing monoolefin (i) include 2-phenyl-1-propene (α-methylstyrene) and 2-phenyl-1-butene.

Specific examples of the phenyl group-containing monoolefin (ii) include 2,4-diphenyl-4-methyl-1-pentene (α-methylstyrene dimer), 3,5-diphenyl-5-methyl-2-heptene, 2,4,6-triphenyl-4,6-dimethyl-1-heptene and 3,5,7-triphenyl-5-ethyl-7-methyl-2-nonene.

Specific examples of the phenyl group-containing monoolefin (iii) include 1,3-diphenyl-1-butene, 2,4-diphenyl-4-methyl-2-pentene and 3,5-diphenyl-5-methyl-3-heptene.

Specific examples of the phenyl group-containing monoolefin (iv) include 1,1-diphenylethylene.

Preferable are 2,4-diphenyl-4-methyl-1-pentene, 2-phenyl-1-propene and 1,3-diphenyl-1-butene.

The amount of the radical chain transfer agent (D) is preferably from 0.01 to 1.5% by weight, more preferably from 0.05 to 1.0% by weight, based on the total amount of components (A) to (D).

The plastic lens according to the present invention can be obtained by heating and copolymerizing a mixture of the components (A) to (D) in the presence of a polymerization initiator with using a molding procedure such as cast mold procedure. Alternatively, a polymerization initiator may be added to the mixture of the components (A) to (D), the mixture is previously somewhat polymerized under a predetermined temperature and then the mixture is charged into a desired mold to thermally cure to give a polymerized mixture. The copolymerization may be conducted by using ionizing radiation such as X-ray and α-ray, and ultraviolet light.

One or at least two organic peroxide or azo compound can be used as the polymerization initiator which can be used to polymerize the raw monomer for the method of the present invention. Specific examples of the polymerization initiator include benzoyl peroxide, diisopropylperoxy dicarbonate, t-butylperoxy pivalate, t-butylperoxy neodecanoate and azobisisobutyronitrile. The amount of the polymerization initiator is at most 10% by weight, for example, from 2 to 8% by weight, based on total amounts of the raw monomers (that is, the components (A), (B), (C) and (D)).

The curable resin composition of the present invention may include colorants such as dyes and pigments, ultraviolet ray-absorbing agents, antioxidants, various stabilizing agents, antistatic agents and photochromic compounds. The curable resin composition of the present invention can contain (meth)acrylate ester in order to decrease the specific density and to improve the flexibility.

The plastic lens can be prepared as follows:
The following materials:
(A) the aromatic diallyl compound,
(B) the maleate diester and/or fumarate diester,
(C) the (meth)allyl carbonate compound,
(D) the radical chain transfer agent,
a necessary polymerization initiator and a necessary additive are mixed and stirred and then defoamed. Then the resultant composition is charged into a mold consisting of mold parts and a gasket by using a nitrogen or air pressure. The polymerization is conducted at 20 to 100° C. for 1 to 48 hours. The resultant cured material is demolded to give a lens. A periphery of the lens is cut and/or stains are cleaned to give a finished product.

The process for preparing the plastic lens comprising the curable composition of the present invention will be explained hereinafter, and is not limited to the followings.

The stirring may be shake using a shaking machine. The stirring time is different depending on the raw materials and is from 3 to 30 minutes in the case that the system has the viscosity of at most 100 cps.

The defoaming removes the dissolved air usually by shaking sometimes under the reduced pressure. When the defoaming is insufficient, the molded product has numerous fine bubbles so that the product is defective. When the product is a cube having a volume of 500 mL and the system has a viscosity of 100 cps, the defoaming is conducted for 3 to 30 minutes.

The mold into which the composition is cast is parallel positioned glass molds having different curvature and is supported by a ring-shaped gasket made of a suitable resin. The gasket has a suitable portion for casting the composition. The composition can be cast by injector having an injection needle.

The polymerization is conducted by gradually increasing the temperature from normal temperature to at most 100° C. The temperature increase rate preferably become larger with considering a half life of the polymerization initiator, as the polymerization time passes. The molded product can be demolded by dismantling the glass molds and gasket cooled to about 60° C. after the completion of the polymerization. The molded product can be finished by cutting periphery of the product lens to regulate the size of the lens and by removing surface contaminants.

PREFERRED EMBODIMENTS OF THE INVENTION

The present invention is illustrating by the following Examples. In the Examples, part(s) is by weight, unless specified.

The measurements in the Examples were conducted as follows:
Refractive Index and Abbe Number
The refractive index and Abbe number were measured at 25° C. by using Abbe refractometer (manufactured by Atago Co. Ltd.) and alpha bromonaphthalene as an intermediate liquid.
Heat Distortion Temperature (°C.)
The heat distortion temperature was measured by using a heat distortion tester (manufactured by Toyo Seiki Sei-sakusho Co. Ltd.) according to JIS K 7206 and 7207.

Impact Resistance
The impact resistance was measured by a drop ball test of USA FDA specification. That is, a 16.2 g steel ball having a diameter of 5/8 inch was dropped from the height of 50 inches (about 127 cm) above the lens. Thirty samples of lens were used and the lens in which no one of samples broke was designated as "pass" (shown by symbol "○").
Initial Coloring
The appearance of the cured material was observed and the non-colored cured material was designated as "pass" (shown by symbol "○"). Yellow colored one was designated as "Δ" and brown colored one was designated as "X".
Crack
The cured material having no crack was designated as "pass" (shown by symbol "○").
Light Resistance
After the cured material was irradiated with light having a wave length of 340 nm at an irradiation intensity of 0.35 $W/m^2$ for 100 hours by a xenon weatherometer (manufactured by Toyo Seiki Co., Ltd.), the cured material having no color in comparison with the initial one was designated as "pass" (shown by symbol "○"). The cured material having slight color (somewhat increase of color concentration) in comparison with the initial one was designated as "Δ". The cured material having remarkable color (remarkable increase of color concentration) in comparison with the initial one was designated as "X".

EXAMPLE 1

A mixture of diallyl isophthalate (71.5 parts by weight), dibutyl maleate (9.1 parts by weight), diethylene glycol bis(allyl carbonate) (18.8 parts by weight), 2,4-diphenyl-4-methyl-1-pentene (0.6 parts by weight) and diisopropyl peroxy dicarbonate (polymerization initiator) (3.5 parts by weight) was cast into a mold consisting of two glass plates and a gasket made of EVA (P-1407 manufactured by Mitsui Dupont Polychemical Co., Ltd.). The mold was immersed in a temperature controlled bath and the temperature was gradually increased from 30° C. to 80° C. over 20 hours. The semi-cured material was demolded and heated at 110° C. for 2 hours for post-polymerization to give a cured material (lens).

The cured material was colorless transparent without initial color and had a refractive index of 1.550, an Abbe number of 37 and a heat distortion temperature of 100° C. The lens had no crack at periphery in the demolding process after the cast polymerization. The lens having a center thickness of 1.6 mm and a power of minus 5 diopter was subjected to the drop ball test of USA FDA specification. That is, a steel ball having a diameter of 5/8 inch and a weight of 16.2 g was dropped from the height of 127 cm (50 inch) above the lens and no break of the lens was confirmed.

EXAMPLES 2 to 5

Mixtures having the compositions (in parts by weight) shown in Table 1 were cast-polymerized and the properties of the cured materials were measured as in Example 1. The results are shown in Table 2.

TABLE 1

| | | Example 1 | Example 2 | Example 3 | Example 4 | Example 5 |
|---|---|---|---|---|---|---|
| Aromatic diallyl compound | diallyl isophthalate | 71.5 | 76.0 | 71.5 | 76.0 | 71.5 |

TABLE 1-continued

|  |  | Example 1 | Example 2 | Example 3 | Example 4 | Example 5 |
|---|---|---|---|---|---|---|
| Diester compound | dibutyl maleate | 9.1 | — | 9.1 | — | 9.1 |
|  | dibenzyl maleate | — | 4.6 | — | 4.6 | — |
| (Meth)allyl carbonate compound | ADC | 18.8 | 18.8 | 18.8 | 18.8 | 18.8 |
| Chain transfer agent | AMSD | 0.6 | 0.6 | — | — | — |
|  | 2ME | — | — | 0.6 | 0.6 | — |
|  | DPET | — | — | — | — | 0.6 |
| Polymerization initiator | IPP | 3.5 | 3.5 | 3.5 | 3.5 | 3.5 |

Note:
ADC: diethylene glycol bis(allyl carbonate)
AMSD: 2,4-diphenyl-4-methyl-1-pentene
2ME: 2-mercaptoethanol
DPET: 1,1-diphenylethylene
IPP: diisopropyl peroxy dicarbonate

TABLE 2

|  | Example 1 | Example 2 | Example 3 | Example 4 | Example 5 |
|---|---|---|---|---|---|
| Refractive index | 1.550 | 1.555 | 1.550 | 1.555 | 1.550 |
| Abbe number | 37 | 38 | 37 | 37 | 37 |
| Heat distortion temperature (° C.) | 100 | 100 | 95 | 96 | 95 |
| Impact resistance | ○ | ○ | ○ | ○ | ○ |
| Initial coloring | ○ | ○ | ○ | ○ | ○ |
| Crack | ○ | ○ | ○ | ○ | ○ |
| Light resistance | ○ | ○ | ○ | ○ | ○ |

Comparative Examples 1 to 4

Mixtures having the compositions (in parts by weight) shown in Table 3 were cast-polymerized as in Example 1. In Comparative Examples 1 and 2, the cured materials were dark brown colored and had no transparency. The crack of periphery of lens was observed during demolding process. The properties of the cured materials were measured. The results are shown in Table 4.

TABLE 3

|  |  | Com. Ex. 1 | Com. Ex. 2 | Com. Ex. 3 | Com. Ex. 4 |
|---|---|---|---|---|---|
| Aromatic diallyl compound | diallyl isophthalate | 100 | 70 | 70 | 80 |
| Diester compound | dibutyl maleate | — | — | — | 10 |
|  | dibenzyl maleate | — | — | — | — |
| (Meth) allyl carbonate compound | ADC | 0 | 30 | 30 | 10 |
| Chain transfer agent | AMSD | — | — | 0.5 | — |
|  | 2ME | — | — | — | — |
|  | DPET | — | — | — | — |
| Polymerization initiator | IPP | 3.5 | 3.5 | 3.5 | 3.5 |

Note:
ADC diethylene glycol bis (allyl carbonate)
AMSD 2,4-diphenyl-4-methyl-1-pentene
2ME 2-mercaptoethanol
DPET 1, 1-diphenylethylene
IPP diisopropyl peroxy dicarbonate

TABLE 4

|  | Com. Ex. 1 | Com. Ex. 2 | Com. Ex. 3 | Com. Ex. 4 |
|---|---|---|---|---|
| Refractive index | 1.573 | 1.550 | 1.550 | 1.553 |
| Abbe number | 32 | 38 | 38 | 36 |
| Heat distortion temperature (° C.) | 270 | 100 | 96 | 95 |
| Impact resistance | X | X | ○ | X |
| Initial coloring | X | X | ○ | Δ |
| Crack | X | X | X | X |
| Light resistance | X | Δ | X | ○ |

The small amount addition of the radical chain transfer agent according to the present invention decreases the conventional initial coloring and brittleness of the cured material.

What is claimed is:

1. A curable resin composition comprising:
   (A) at least one aromatic diallyl compound,
   (B) at least one maleate diester and/or fumarate diester represented by the general formula (1):

$$R^1-OOCCH=CHCOO-R^2 \tag{1}$$

wherein $R^1$ and $R^2$ is, same or different, an alkyl group, cycloalkyl group, aralkyl group, aryl group, alkenyl group or alkynyl group having 1 to 15 carbon atoms,
   (C) at least one (meth)allyl carbonate compound represented by the general formula (2):

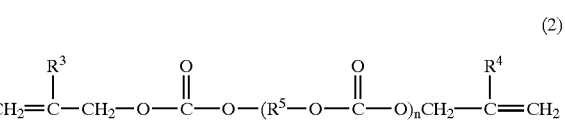

$$CH_2=\overset{R^3}{\underset{|}{C}}-CH_2-O-\overset{O}{\underset{\|}{C}}-O-(R^5-O-\overset{O}{\underset{\|}{C}}-O)_nCH_2-\overset{R^4}{\underset{|}{C}}=CH_2 \tag{2}$$

wherein $R^3$ and $R^4$ is, same or different, a hydrogen atom or a methyl group, $R^5$ is a divalent organic group optionally having an oxygen atom, and n is from 1 to 10, and
   (D) at least one radical chain transfer agent.

2. A curable resin composition according to claim 1, wherein the aromatic diallyl compound (A) is from 40 to 90% by weight, the maleate ester/fumarate diester (B) is from 1 to 30% by weight, the (meth)allyl carbonate compound (C) is from 5 to 50% by weight, and the radical chain transfer agent (D) is from 0.01 to 1.0% by weight, based on the total amount of components (A) to (D).

3. A curable resin composition according to claim 1, wherein the aromatic diallyl compound (A) is at least one compound selected from the group consisting of diallyl orthophthalate, diallyl isophthalate and diallyl terephthalate.

4. A curable resin composition according to claim 1, wherein the diester (B) is at least one compound selected from the group consisting of dibutyl maleate, dibenzyl maleate, diethyl maleate, dibutyl fumarate, dibenzyl fumarate and diethyl fumarate.

5. A curable resin composition according to claim 1, wherein the (meth)allyl carbonate compound (C) is at least one compound selected from the group consisting of diethylene glycol bisallyl carbonate, diethylene glycol bisallyl carbonate dimer and diethylene glycol bisallyl carbonate trimer.

6. A curable resin composition according to claim 1, wherein the radical chain transfer agent (D) is a phenyl group-containing monoolefins.

7. A curable resin composition according to claim 1, wherein the radical chain transfer agent (D) is at least one compound selected from the group consisting of 2,4-diphenyl-4-methyl-1-pentene, 2-phenyl-1-propene, 1,3-diphenyl-1-butene.

8. A plastic lens comprising a cured material of curable resin composition according to claim 1.

9. A plastic lens comprising a cured material of curable resin composition according to claim 2.

10. A plastic lens comprising a cured material of curable resin composition according to claim 3.

11. A plastic lens comprising a cured material of curable resin composition according to claim 4.

12. A plastic lens comprising a cured material of curable resin composition according to claim 5.

13. A plastic lens comprising a cured material of curable resin composition according to claim 6.

14. A plastic lens comprising a cured material of curable resin composition according to claim 7.

* * * * *